United States Patent Office 2,891,358
Patented June 23, 1959

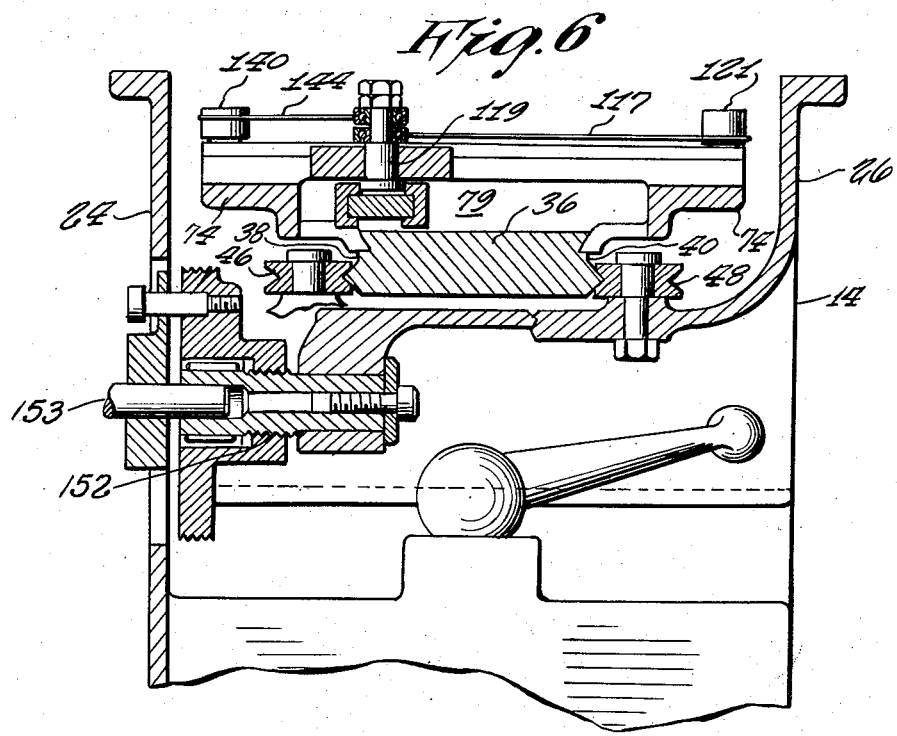
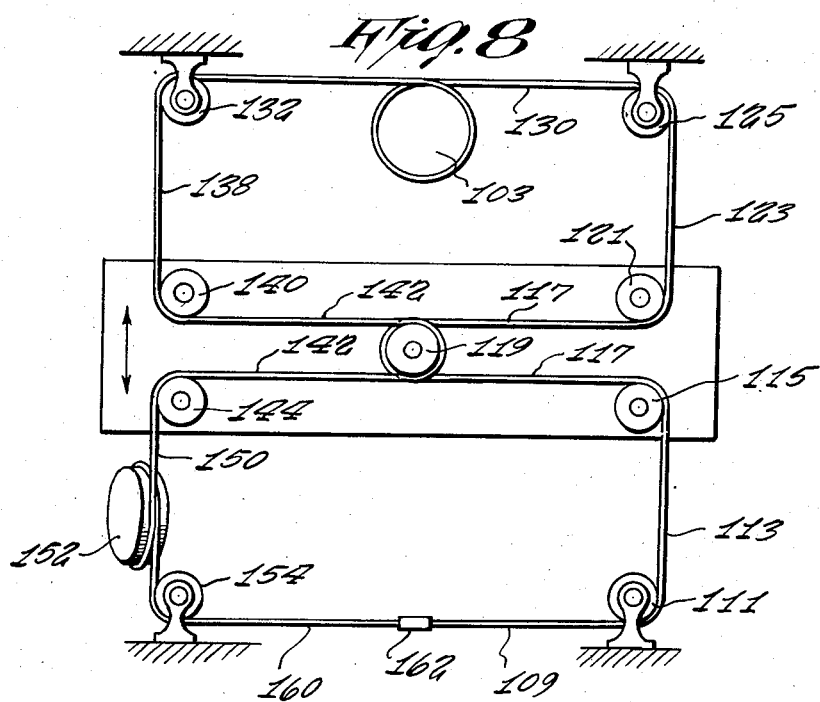

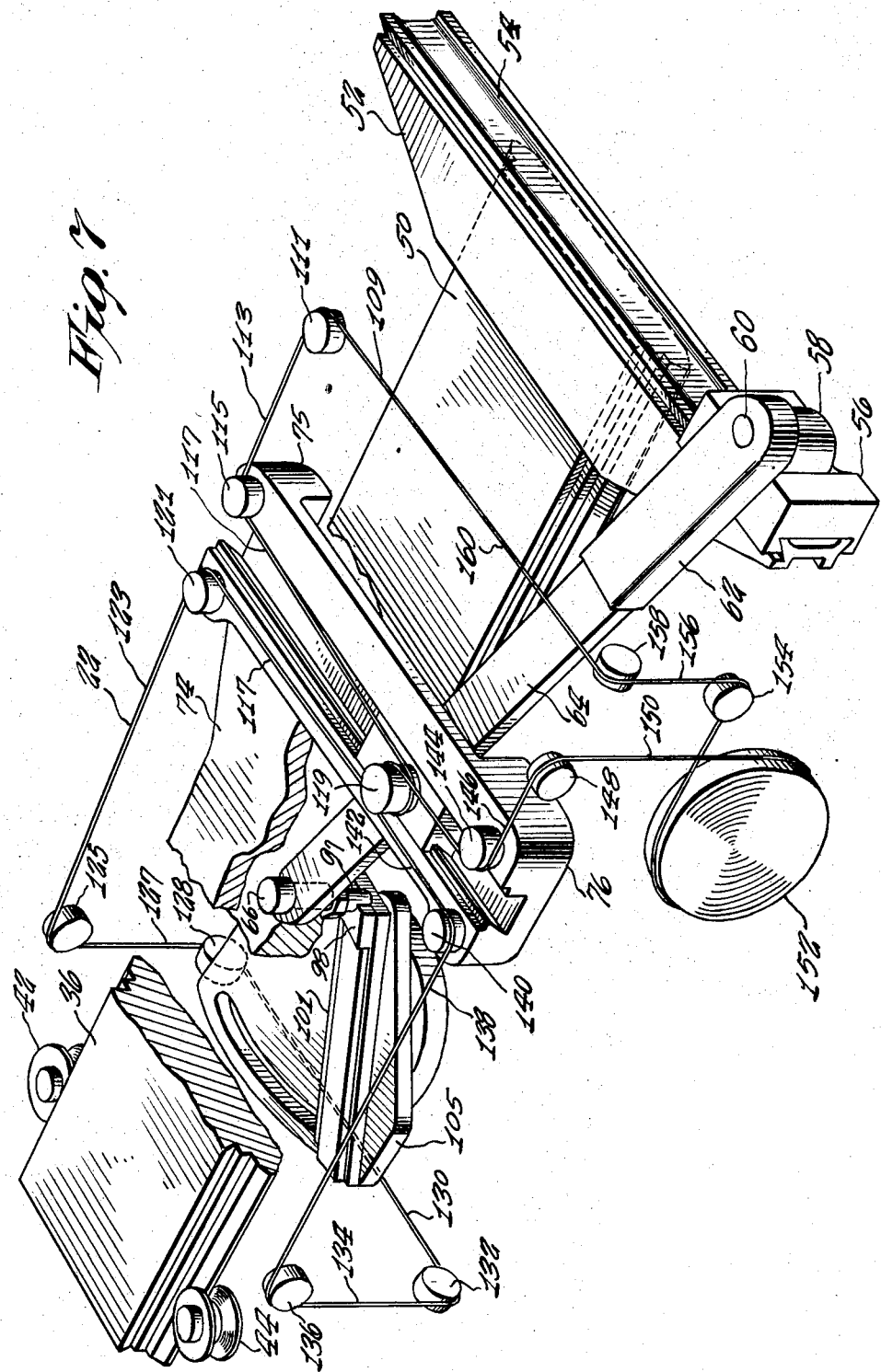

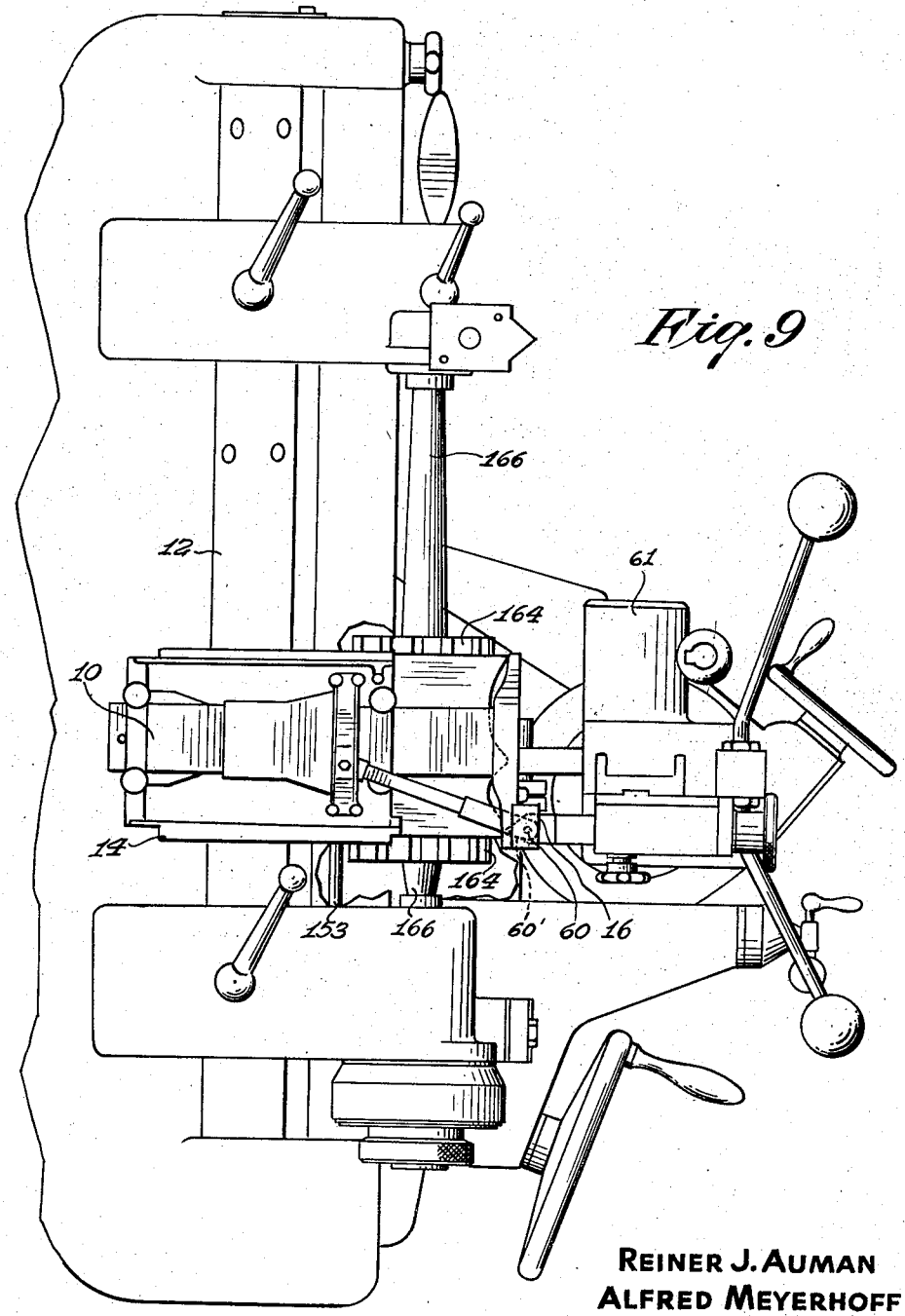

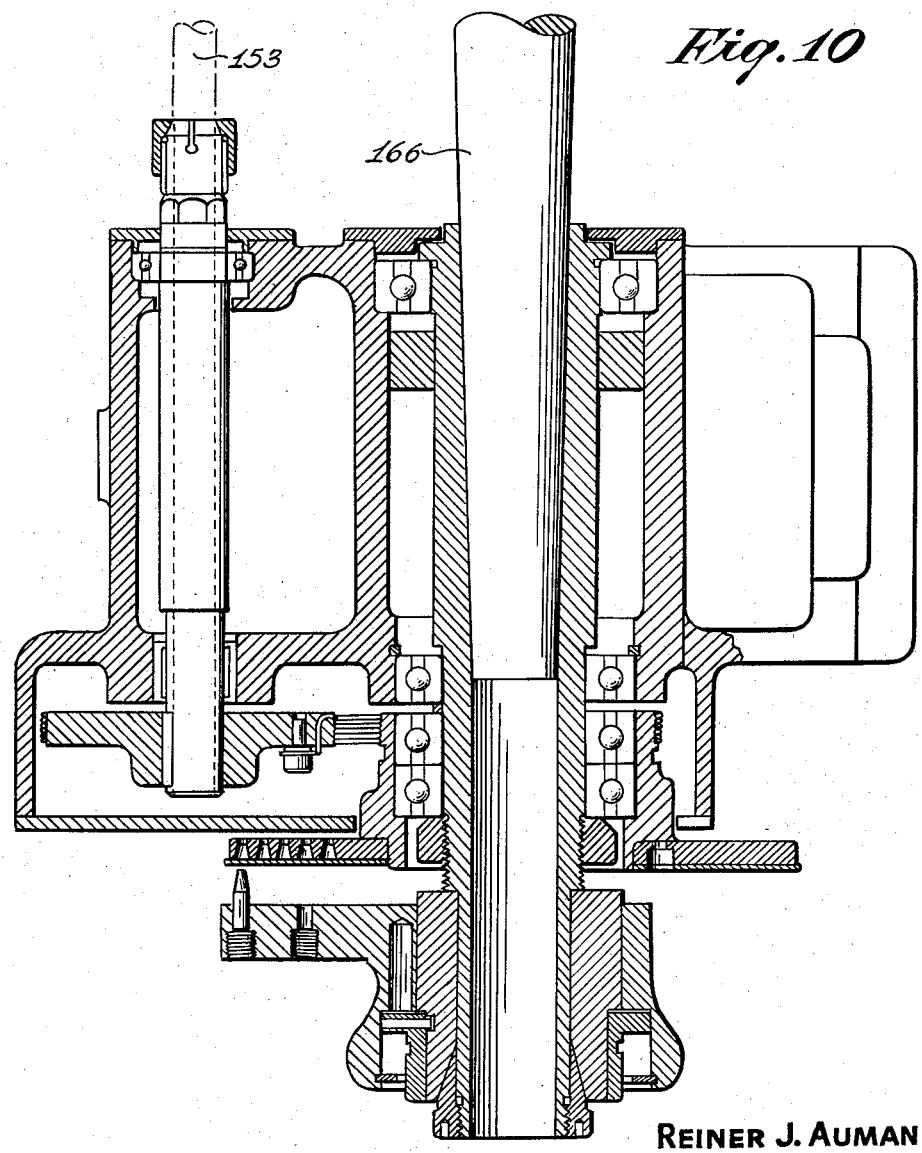

2,891,358

SPIRAL RAKE COMPENSATOR FOR CUTTER GRINDING MACHINES

Reiner J. Auman, Brooklyn, and Alfred Meyerhoff, Queens, N.Y., assignors to Kerns Manufacturing Corp., Long Island City, N.Y., a corporation of New York Application November 23, 1953, Serial No. 393,795

6 Claims. (Cl. 51—100)

This invention relates generally to the field of machine tools, and more particularly to an improved structure for controlling and adjusting the position of milling cutters with respect to a grinding wheel, and the like, of a type normally used on milling machines and similar types of machine tools.

In recent years there has been a marked increase in what is known in the art as profile cutters. These cutters are of considerable axial length, and are ground so that a given profile is reproduced upon the cutting surfaces thereof to be again reproduced upon the work. These cutters have extensive application in the aircraft industry, where it is often necessary to machine out surplus metal in the interest of lightness without sacrificing strength. For the most part, the most desirable cutters have been of a spiral type, in which the cutting edges are helically or spirally disposed with respect to the axis of rotation of the cutter, as it has been found this type of cutter affords smoother machining, with less power required to drive the tool, and a substantial elimination of all tendencies for the tool to chatter upon contact with the work.

While this type of tool has proven to be superior in actual use as compared with other types of cutters, difficulty has been encountered in properly grinding the required profile upon the cutting surfaces or teeth of the cutter. Since the cutting edges of the cutter are not parallel with the axis of rotation of the same, grinding the profile into the cutter is not simply a matter of following a profile cam and duplicating the profile along a second straight edge. Two factors enter into the problem, both of which require substantial compensation by way of adjusting the position of the cutting edge of the cutter with respect to the grinding wheel. Firstly, in order to provide sufficient clearance for the chips of material which are cut from the work as the cutter revolves, the cutting edge is provided with what is known as a "rake" angle, which also provides that the cutting edge acts to peel the material from the work as the same is cut. Compensation is also required because the cutting edge is disposed in the form of a helix.

Compensating for the rake of the tool is not a fixed compensation, but varies depending upon the distance from the points being ground, to the axis of rotation of the cutter. These compensations must be made simultaneously, as each point being ground has a degree of rake, as well as a degree of spiraling measured from adjoining points on the cutter.

The problem is further complicated by the fact that helical cutters for use in profile grinding are not currently manufactured to a uniform standard. Not only are the edges of the cutters provided with different degrees of rake, but different degrees of spiraling are used, depending upon the purpose for which the cutter is to be used, the depth of cut which will be made, the material from which the cutter is formed, the material to be machined, and the particular choice of the manufacturer of the cutter. While devices have been developed which are adapted to adjust a grinding wheel for individual cutters, no single device has been developed in the prior art which is adapted to afford proper compensation for grinding several different forms of cutters without substantial adjustment.

It is therefore among the principal objects of the present invention to provide a spiral rake compensator for use in conjunction with a grinding machine which is adapted to adjust the cutter mounted on such a machine to compensate for the degree of rake, spiral, or combination of rake or spiral, of the cutting edges of the cutter.

Another object of the present invention lies in the provision of a spiral rake compensator of the type described which may be conveniently and readily adjusted for use in cutting substantially all of the various types, shapes and sizes of spiral cutters now commercially available in this country.

Another object of the invention lies in the provision of a spiral rake compensator of the class described which may be relatively simple in structure, and inherently durable, so as to require a minimum amount of servicing throughout a relatively long useful life.

A further object of the invention lies in the provision of a spiral rake compensator for use in conjunction with a grinding machine in which the cost of fabrication may be of a relatively low order, with consequent wide sale, distribution and use throughout the art.

Another object of the invention lies in the provision of spiral rake compensator structure for use with a grinding machine which may be adjusted for use in grinding a wide variety of cutters without the necessity of employing a wide variety of cams, parts or auxiliary devices, thereby eliminating additional factors tending to add to the cost of manufacture, and avoiding the necessity of keeping a large number of such cam profiles, parts or devices in stock.

A feature of the invention lies in the fact that adjustment of the device for use with a particular cutter is a simple procedure, requiring only the use of tools with which the ordinary machinist skilled in the art is familiar.

Another feature of the device lies in the fact that the device itself may be used as a gauge to determine the proper degree of rake and spiral compensation, after which the amount may be stamped upon the cutter, so that upon regrinding the cutter, it is necessary only for the workman to make a few simple adjustments, after which grinding may be commenced.

Before entering into a detailed consideration of the invention, it is believed that a short discussion of the nature of problems encountered in grinding spiral cutters to a given profile, is appropriate.

To duplicate a profile formed along a straight line upon a straight edge is a relatively simple matter. Where cutters having axially disposed cutting edges with little or no rake at the cutting edge, are ground, substantially no problems of the type overcome by the structure embodying the present invention are involved. A cam follower simply follows the cam outline, the follower guiding a grinding wheel much in the manner in which keys for ordinary tubular locks are usually duplicated. If, however, the cutters are provided with a substantial degree of rake, the surface upon which the grinding takes place, which surface will form the cutting edge, is not radially disposed with respect to the axis of rotation of the cutter. The cutting edge, as ground, will therefore be an accurate reproduction of the desired profile, only where the profile coincides with the outermost extremity of the unground cutter. Depending upon the degree of rake, the profile will become more and more distorted from the true shape as the grinding wheel moves closer to the axis of rotation of the cutter. This distortion is not eliminated upon regrinding or resharpening the cutter, since the rake angle is not constant throughout the entire depth of the cutting tooth. When the cutters are ground by the method of following a profile, therefore, it is necessary that a compensating rotation be introduced to the cutter as the grinding wheel moves toward the axis of rotation, so that all grinding is done on a horizontal line or plane which passes through the axis of rotation of the cutter.

Where the cutter being ground is of a spirally toothed type, as the cam follower follows the profile, the grinding wheel will progress axially along the principal axis of the cutter. In order that the grinding of the tooth of the cutter be performed in the above-mentioned plane, it is necessary that the cutter be rotated about its axis of rotation to bring that portion of the spiral tooth being instantaneously ground into the plane.

Most modern cutters today include spiral teeth having an angular rake. It is therefore necessary that each component of helix or rake be individually and simultaneously compensated for as the grinding takes place.

With the foregoing discussion in mind, reference may now be had to the drawings, in which similar reference characters have been employed to designate corresponding parts throughout the several views.

Figure 6 is a fragmentary vertical transverse sectional view as seen from the plane 6—6 on Figure 1.

Figure 7 is a fragmentary schematic view showing the interconnection of the operative parts comprising the embodiment.

Figure 8 is a schematic view showing a linkage element interconnecting the spiral compensator element, and rake compensator element.

Figure 9 is a fragmentary plan view showing a typical installation of the embodiment upon a conventional type cylinder grinding machine.

Figure 10 is a fragmentary sectional view showing a linkage means interconnecting the device to drive the headstock of the grinding machine shown on Figure 9.

Figure 4:
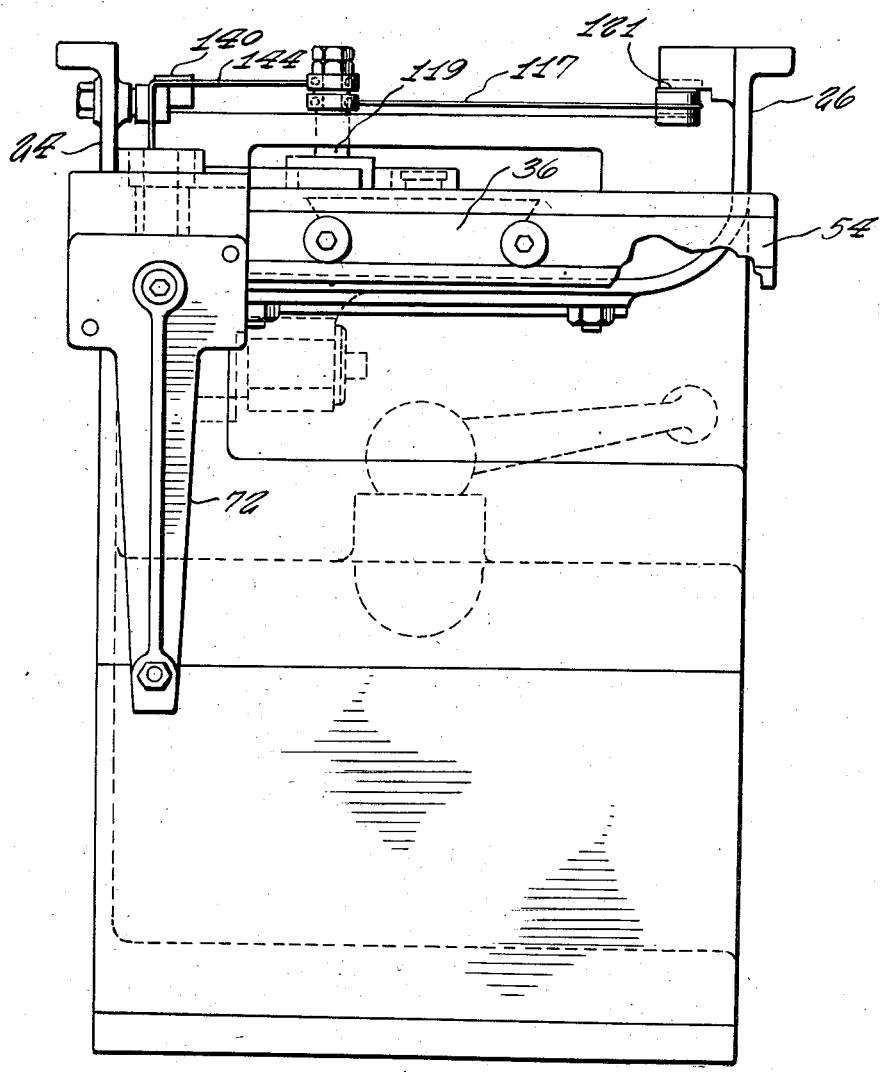
Figure 4 is a fragmentary front elevational view.

In accordance with the invention, the device, generally indicated by reference character 10, is shown in conjunction with a grinding machine 12, the details of which form no part of the subject matter of the present application. The device 10 includes a base or frame element 14, best seen on Figure 4, a profile follower element 16, best seen on Figure 2, a spiral compensating element 18, best seen on Figure 1, a rake compensating element 20, also seen on Figure 1, and compensation transmission means 22, best seen on Figure 7.

The base or frame element 14 may be of any desired construction consistent with mechanical strength, and may form a part of the frame of the grinding machine 12. It includes generally a pair of side members 24 and 26, interconnected by suitable web members, one of which is indicated by reference character 28, as well as a horizontally disposed support member 30, upon which the device 10 is mounted.

Figure 1:
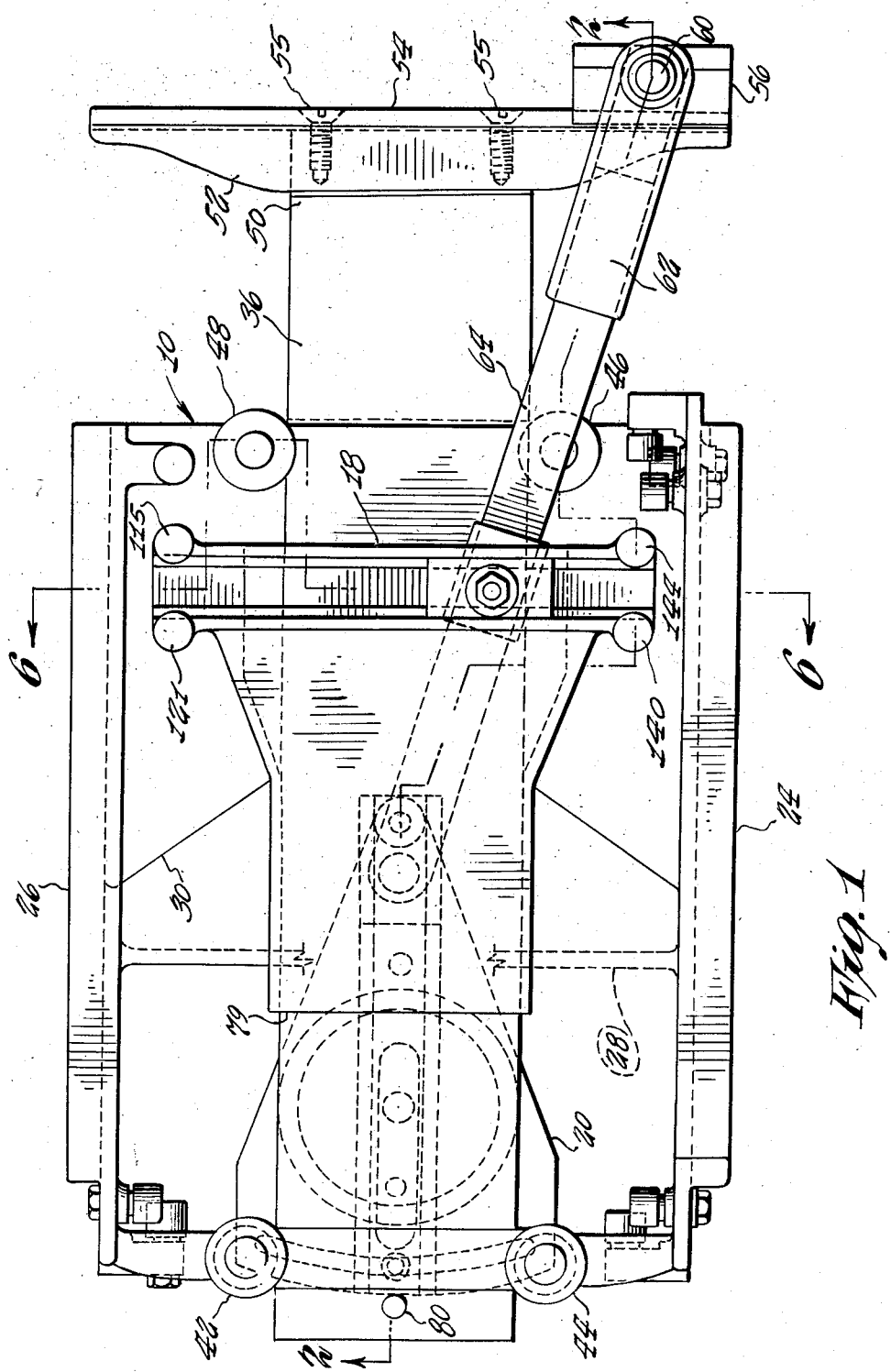
Figure 1 is a plan view of a spiral rake compensator embodying the invention.
Figure 2:
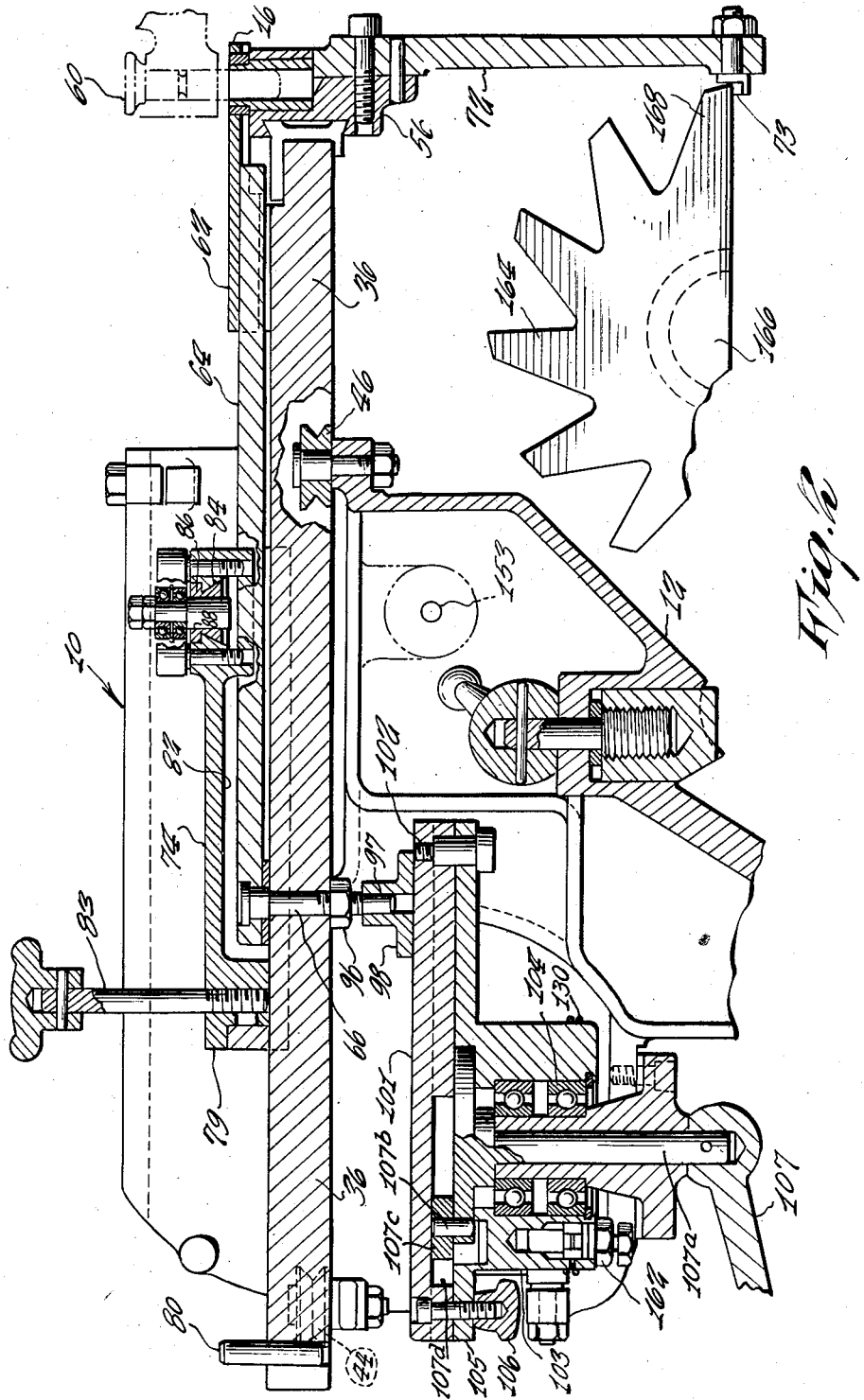
Figure 2 is a fragmentary vertical longitudinal offset sectional view as seen from the plane 2—2 on Figure 1.
Figure 3:
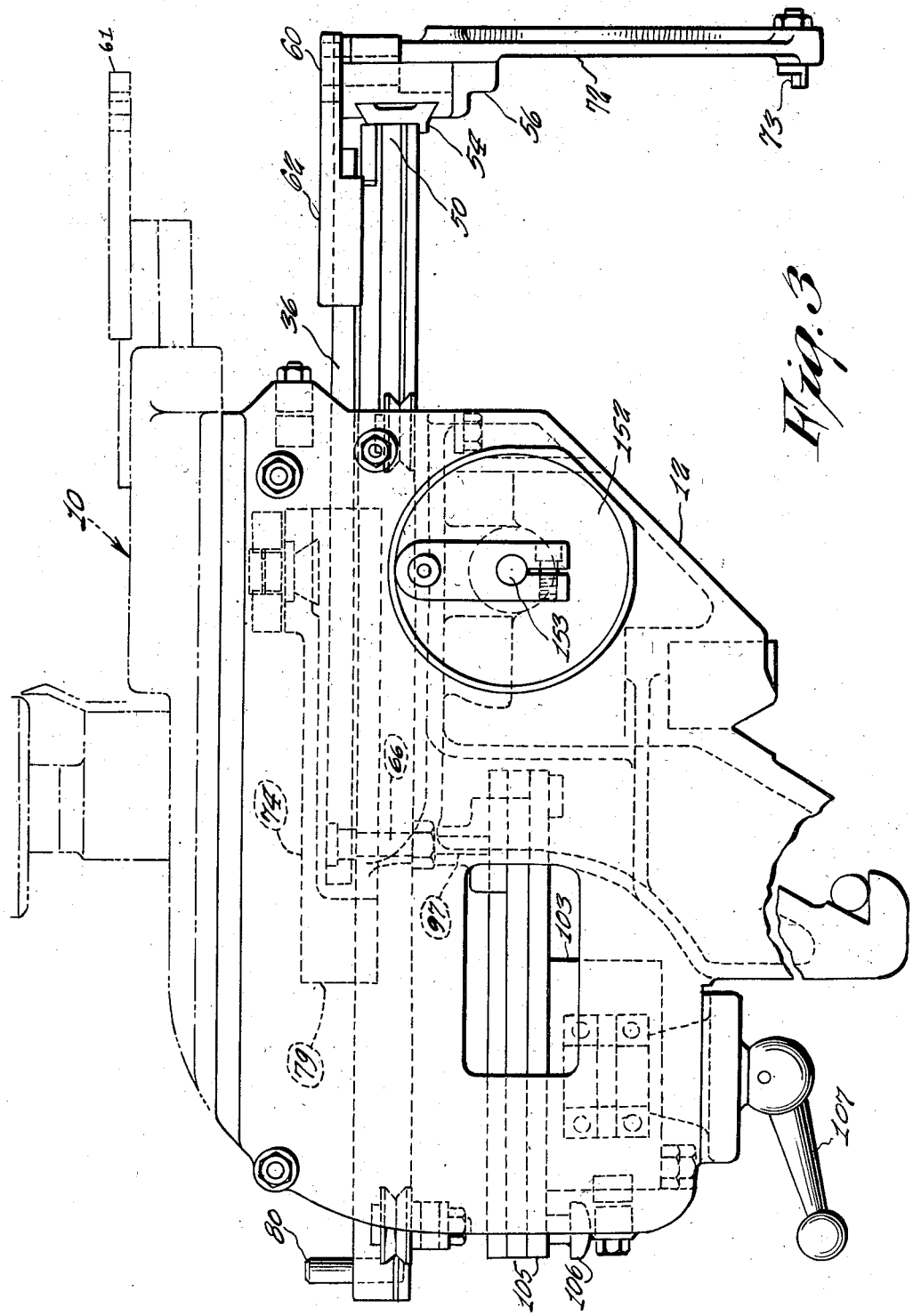
Figure 3 is a side elevational view of the embodiment.

The profile follower element 16 is perhaps best seen on Figures 1 and 2, and includes a longitudinally reciprocating member 36, having side edge portions 38 and 40 which are adapted to be supported by four vertically mounted roller members 42, 44, 46 and 48. The forward end 50 of the reciprocating member 36 (see Figure 7) is provided with a horizontally disposed guide member having a dovetailed groove member 54 secured thereto by screws 55, or other suitable attaching means. A sliding block member 56 is disposed for rectilinear movement within the dovetailed portion, the block member 56 including a bearing 58, supporting a vertically disposed pin 60 which couples to the movable grinding wheel assembly 60' (see Figure 9) which comprises a part of the grinding machine 12. Profile contact means 61 is positioned directly above the grinding wheel in a well known manner, so that the outlines of the desired cam profile are transmitted through the pin 60, both to the grinding wheel and to the profile follower element 16.

A sliding member 62 is positioned upon a pivotally mounted arm 64 which is supported for movement about a vertical axis by a shaft 66 on the reciprocating member 36 (see Figure 2).

Depending downwardly from the block member 56 is a gauge member 72, having a gauging edge 73, adapted to contact the cutting edge of an individual tooth of a cutter, the operation of which is best deferred to a point later in this specification.

The spiral compensator element 18 includes a longitudinally disposed support member 74, having a pair of side members 75 and 76, which are adapted to ride upon the reciprocating member 36, a locking screw 83 (best seen on Figure 2) fixing any given mutual adjustment. The member 74 includes a rear edge surface 79 adapted to abut the stop 80 which engagement determines the rearward limit of motion possible between the members 74 and 36. A transverse dovetail slot 84 extends across the more forwardly portion of the member 74, in which there is disposed a sliding block 86 having a central orifice 88.

The rake compensating element 20 is connected to the reciprocating member 36 through the shaft 66, which is retained in position by means of a nut 96. The shaft 66 includes an unthreaded lower portion 97 which engages a sliding block 98 disposed immediately therebeneath. The block 98 is provided with a groove 100 adapted to engage a track member 101, which is pivotally connected through a threaded pin 102 to the index plate 105, a drum member 103, mounted for vertical rotation by bearings 104 upon the frame element 14. The drum member 103 is provided with an index plate 105 fixed thereupon which may be locked in position with respect to the track member 101 by means of a thumb screw 106. The drum member 103 may be rotated manually during adjustment by means of a small handle 107 upon loosening the thumb screw 106. Motion is transmitted through the handle 107 (see Figure 2), the shaft 107a, and the pin 107b. The pin 107b is mounted on a block 107c, in turn slidably mounted in a track 107d on the drum member 103.

Figure 5:
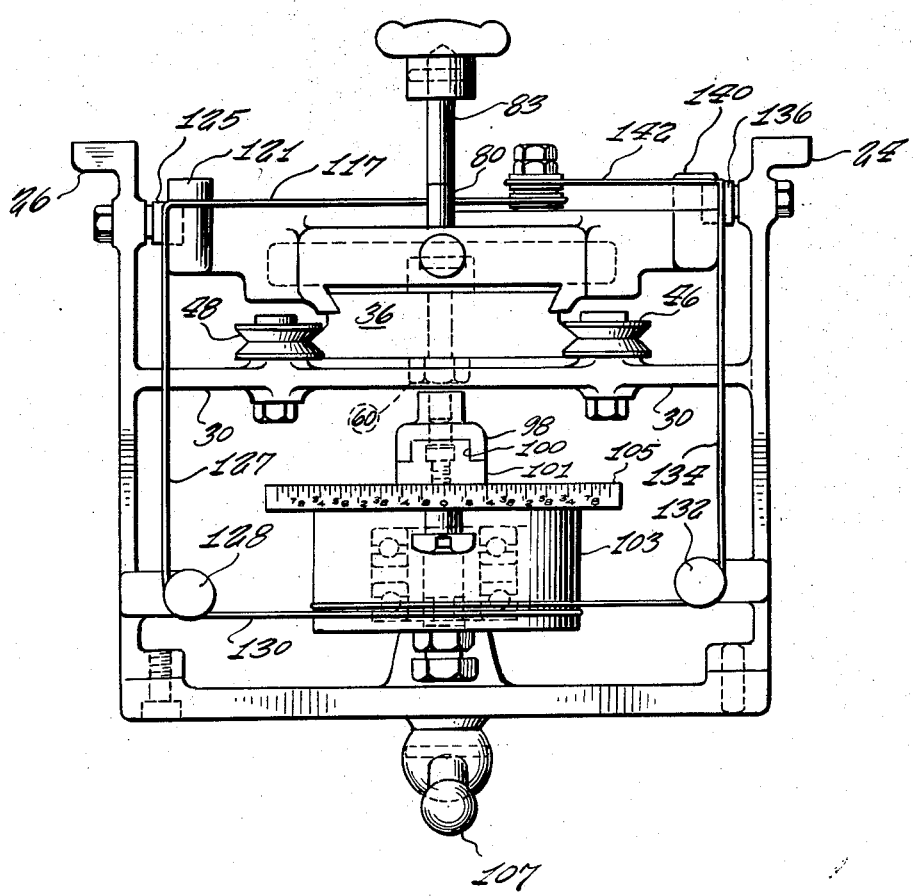
Figure 5 is a rear elevational view.

The compensation transmission means 22 is in the form of an elongated cable, preferably formed from stranded steel wire, so as to have a very high modulus of elasticity. The means 22 interconnects both the spiral compensating element 18 and the rake compensating element 20 with the profile follower element 16. Referring to Figure 7 of the drawings, the means 22 includes a horizontally and transversely disposed portion 109, a longitudinally disposed portion 113, a loop portion 117 (also seen on Figure 6), a second longitudinal portion 123, a vertically disposed portion 127, a transverse loop portion 130, a vertically disposed portion 134, a longitudinally disposed portion 138, a looped portion 142, a longitudinal portion 146, a looped portion 150, a vertical portion 156, and a transverse portion 160. The means 22 is maintained in the orientation shown on Figure 7 by the pulleys 111, 115, 121, 125, 128, 132, 136, 140, 144, 148, 154 and 158, the required tension being obtained by tension adjusting means 162. The means 22 is passed about a supporting roller 119, schematically shown on Figure 7, and better illustrated on Figures 2, 4 and 6 at the portions 117 and 144, and between the pulleys 128 and 132, the portion 130 is looped about the drum 103 (see Figure 5). The portion 150 is looped about the drum 152 a sufficient number of times to avoid the possibility of slippage, which drum is supported on the shaft 153 for rotation about an axis parallel to that of the cutter being ground. The shaft 153 is geared or otherwise connected to the shaft 166 upon which the cutter 164 is mounted by means, as shown on Figure 10. It is to be understood, that the structure of Figure 10 is purely exemplary, the specific details of interconnection varying with the construction of the headstock of the grinding machine upon which the device is installed, and forming no part of the present invention.

Reference is now made to Figure 8 wherein there is shown a schematic view of the means 22 substantially in a horizontal plane, eliminating the vertically disposed portions which do not affect the operation of the device. From a consideration of this view it will be apparent that if the drum 103 is held stationary, movement of the bearing 119 will result in shifting the loop included by portions 109, 113, 117, 150 and 160, in either a clockwise or counter-clockwise direction, thereby correspondingly rotating the drum 152. Similarly, if the bearing 119 is maintained stationary, movement of the drum 103 will shift the loop defined by portions 117, 123, 130, 138 and 146, in either a clockwise or counter-clockwise direction, thereby rotating the loop defined by portions 109, 113, 117, 146 and 150, independently of the bearing 119, which merely rotates without translational movement to permit the means 22 to ride thereupon.

When holding both drums 103 and 152 stationary, the complete assembly comprising pulleys 115, 121, 140, 144 and 119 can be moved in the direction of the arrow (Figure 8) without any influence on the system.

Correspondingly, when moving the reciprocating member 36 carrying the spiral compensating unit 18 along its track as defined by roller members 42, 44, 46 and 48, the shaft 66 moving the block 98 along the track member 101 will rotate the drum 103 by an amount in proportion to the fixed angular adjustment of the track member 101 on the drum 103. In this manner rake compensation is accomplished irrespective of spiral compensation.

Reference is now made to Figure 7 of the drawing, wherein the relationship between the means 22 and the remaining elements comprising the device is shown. As the member 56 is slid transversely within the dovetail portions 54, the bearing 119 is moved a proportional distance within the transversely disposed dovetailed groove 84. In this way spiral compensation is accomplished irrespective of the presence of rake.

Operation

The operation of the device, from the standpoint of setting up the work upon the same is as follows:

Assuming that the profile to be duplicated has been set upon the grinding machine, a spiral cutter having an unknown degree of rake and unknown degree of spiral is selected. This cutter is fixed upon the shaft 166, after which the guiding surface 73 of the finger member 72 is aligned at one end of a cutter tooth 168. The sliding block 56 is then traversed in the member 54, and it is observed as to whether the guide surface 73 remains in contact with the tooth 168. In the normal first trial, this will not be the case, and the screw 83 is then loosened to permit the member 74 to slide leftward or rightward, as seen on Figure 2, and the operating is repeated. After trial and error, a point will be found at which the surface 73 remains in contact with the tooth 168, through the length of the traverse, after which the screw 83 is tightened and the distance between the surface 79 and the stop member 80 is carefully measured.

The degree of rake adjustment may also be determined by trial and error, by moving the gauge member 72 along the tooth 168 in a centripetal direction toward the axis of rotation. This slight inward motion, obtained by rotating the cutter in a clockwise direction as seen on Figure 2 of the drawing results in an observable movement of the index plate 105 which may be measured on the scale.

The finger member 72 may now be removed prior to the commencement of the grinding operation, as compensation is determined completely and automatically by the movement of the spiral compensating element 18 and rake compensating element 20 during grinding.

At the completion of these trials, the cutter may be removed from the spindle or shaft 166, and the necessary data stamped upon the cutter itself. This will enable the machinist to reset the index wheel 105 and the distance between the surface 79 and the member 80, without additional trial when the cutter is resharpened.

It may thus be seen that we have invented novel and highly useful improvements in combination rake and spiral compensation devices for use in conjunction with grinding machines, in which there has been provided a simple durable device requiring a minimum of servicing which may be easily adapted for machining a very wide variety of milling cutters. The device requires no supplementary accessories upon changing the type of cutter being ground, and has substantially no parts which are subject to adverse wear with resultant misalignment and inaccuracy, as has been the case in prior art devices. The device may be produced at a reasonably low cost, and may be adapted to a wide variety of existing grinding machines of the type described.

We wish it to be understood that we do not consider the invention limited to the exact details of structure shown and set forth in this specification, for obvious modifications will occur to those skilled in the art to which the present invention relates.

We claim:

1. In a cutter grinding machine having a grinding wheel and spindle means for supporting spiral cutters for axial rotation thereon as the cutting edges thereof are ground to shape, the improvement comprising: a spiral compensating device comprising an elongated reciprocating member, means supporting said elongated reciprocating member for rectilinear movement with respect to said grinding machine and perpendicular to the axis of said spindle means, an arm, means supporting said arm in pivotal association with said reciprocating member, a drum mounted on said spindle means for rotation therewith, cable means interconnecting said drum and a fixed point on said arm whereby planar motion of said arm is transmitted to result in rotational motion of said drum and spindle; a gauging finger on said arm having a gauging surface thereupon adapted to engage the cutting edge of a cutter on said spindle, and means to adjust the relative position of said fixed point with respect to the pivotal axis of said arm, whereby said gauging surface may continually contact a cutting edge of said cutter as said arm is moved in a plane parallel to the axis of said cutter.

2. In a cutter grinding machine having a grinding wheel and spindle means for supporting spiral cutters for axial rotation thereon as the cutting edges thereof are ground to shape, the improvement comprising: a rake compensating device including an elongated reciprocating member, means for supporting said elongated reciprocating member for rectilinear movement upon said cutter grinding machine in a direction substantially perpendicular to the axis of said spindle means, an arm, means pivotally associating said arm upon said reciprocating member, a first rotating means having a diametrically disposed track member thereupon, means supporting said rotating means to dispose said track member in parallel relation with respect to said reciprocating member, said reciprocating member having projecting means thereupon slideably engageable on said track member; said spindle means having a second rotating means mounted co-axially therewith; and third means interconnecting said first and second rotating means, whereby upon planar movement of said arm, components of movement parallel to the line of motion of said reciprocating member are transmitted to said first rotating means, and through said third means to said second rotating means.

3. In a cutter grinding machine having a grinding wheel and spindle means for supporting spiral cutters for axial rotation thereon as the cutting edges thereof are ground to shape, the improvements comprising: a combination spiral and rake compensating device including: an elongated reciprocating member, means for supporting said elongated reciprocating member for rectilinear movement with respect to said grinding machine in a direction substantially perpendicular to the axis of said spindle means, an arm, means pivotally associating said arm with respect to said reciprocating member, a first drum having a diametrically disposed track member thereupon and means for supporting said drum for rotation about an axis substantially perpendicular to the plane of motion of said elongated reciprocating member, said reciprocating member having projecting means thereupon slideably engageable with said track member; said spindle means having a second drum connected thereto for rotation therewith, cable means interconnecting said first and second drums and a fixed point on said arm, whereby planar motion of said arm is transmitted through said cable means to result in rotational motion of said second drum and spindle means; a gauging finger on said arm, having a gauging surface adapted to engage a cutting edge of a cutter, and means to adjust said fixed point with respect to the pivotal axis of said arm.

4. In a cutter grinding machine having a grinding wheel and spindle means for supporting spiral cutters for axial rotation thereon as the cutting edges thereof are ground to shape, the improvements comprising: a combination spiral and rake compensating device including: an elongated reciprocating member, means for supporting said elongated reciprocating member for rectilinear movement with respect to said grinding machine in a direction substantially perpendicular to the axis of said spindle means, an arm, means pivotally associating said arm with respect to said reciprocating member, a first drum having a diametrically disposed track member thereupon and means for supporting said drum for rotation about an axis substantially perpendicular to the plane of motion of said elongated reciprocating member, said reciprocating member having projecting means thereupon slideably engageable with said track member; said spindle means having a second drum connected thereto for rotation therewith, cable means interconnecting said first and second drums and a fixed point on said arm, whereby planar motion of said arm is transmitted through said cable means to result in rotational motion of said second drum and spindle means; a gauging finger on said arm, having a gauging surface adapted to engage a cutting edge of a cutter, means to adjust said fixed point with respect to the pivotal axis of said arm; and means for adjusting the relative angular position of said first drum with respect to the linear position of said elongated reciprocating member.

5. In a cutter grinding machine having a grinding wheel and spindle means for supporting spiral cutters for axial rotation thereon as the cutting edges thereof are ground to shape, the improvements comprising: a combination spiral and rake compensating device including: an elongated reciprocating member, means for supporting said elongated reciprocating member for rectilinear movement with respect to said grinding machine in a direction substantially perpendicular to the axis of said spindle means, an arm, means pivotally associating said arm with respect to said reciprocating member, a first drum having a diametrically disposed track member thereupon and means for supporting said drum for rotation about an axis substantially perpendicular to the plane of motion of said elongated reciprocating member, said reciprocating member having projecting means thereupon slideably engageable with said track member; said spindle means having a second drum connected thereto for rotation therewith, cable means interconnecting said first and second drums and a fixed point on said arm, whereby planar motion of said arm is transmitted through said cable means to result in rotational motion of said second drum and spindle means; a gauging finger on said arm, having a gauging surface adapted to engage a cutting edge of a cutter, and means to adjust said fixed point with respect to the pivotal axis of said arm; and graduated means for adjusting the relative angular position of said first drum with respect to the linear position of said elongated reciprocating member.

6. In a cutter grinding machine having a grinding wheel and spindle means for supporting spiral cutters for axial rotation thereon as the cutting edges thereof are ground to shape, the improvements comprising: a combination spiral and rake compensating device including: an elongated reciprocating member, means for supporting said elongated reciprocating member for rectilinear movement with respect to said grinding machine in a direction substantially perpendicular to the axis of said spindle means, an arm, means pivotally associating said arm with respect to said reciprocating member, a first drum having a diametrically disposed track member thereupon and means for supporting said drum for rotation about an axis substantially perpendicular to the plane of motion of said elongated reciprocating member, said reciprocating member having projecting means thereupon slideably engageable with said track member; said spindle means having a second drum connected thereto for rotation therewith, cable means interconnecting said first and second drums and a fixed point on said arm, whereby planar motion of said arm is transmitted through said cable means to result in rotational motion of said second drum and spindle means; a gauging finger on said arm, having a gauging surface adapted to engage a cutting edge of a cutter, means to adjust said fixed point with respect to the pivotal axis of said arm; and means for adjusting the relative angular position of said first drum with respect to the linear position of said elongated reciprocating member; said means for adjusting the relative position of said fixed point with respect to the pivotal axis of said arm comprising a member slideably disposed upon said reciprocating member, and fixedly adjustable with respect to the same, said member having a track means, the axis of which is disposed at right angles with respect to the path of reciprocation of said reciprocating member; sliding means adapted to engage said track and said arm, a portion of said sliding means forming said fixed point.

References Cited in the file of this patent

UNITED STATES PATENTS

| | | |
|---|---|---|
| 1,135,780 | Drummond et al. | Apr. 13, 1915 |
| 1,710,533 | De Vlieg | Apr. 23, 1929 |
| 1,870,764 | Aeppli | Aug. 9, 1932 |
| 2,376,110 | Aeppli | May 15, 1945 |
| 2,419,529 | Braaten | Apr. 29, 1947 |
| 2,597,648 | Lucas | May 20, 1952 |